US010106339B2

(12) United States Patent
Prüssmeier

(10) Patent No.: US 10,106,339 B2
(45) Date of Patent: Oct. 23, 2018

(54) XY TABLE FOR A LINEAR TRANSPORT SYSTEM

(71) Applicant: BECKHOFF AUTOMATION GMBH, Verl (DE)

(72) Inventor: Uwe Prüssmeier, Lemgo (DE)

(73) Assignee: BECKHOFF AUTOMATION GMBH, Verl (DE)

( * ) Notice: Subject to any disclaimer, the term of this patent is extended or adjusted under 35 U.S.C. 154(b) by 0 days.

(21) Appl. No.: 15/589,964

(22) Filed: May 8, 2017

(65) Prior Publication Data

US 2017/0247201 A1 Aug. 31, 2017

Related U.S. Application Data

(63) Continuation of application No. PCT/EP2015/077535, filed on Nov. 24, 2015.

(30) Foreign Application Priority Data

Nov. 24, 2015 (DE) ........................ 10 2014 117 150

(51) Int. Cl.
*B65G 54/02* (2006.01)
*H02K 7/14* (2006.01)
(Continued)

(52) U.S. Cl.
CPC ............. *B65G 54/02* (2013.01); *B65G 35/06* (2013.01); *B65G 47/962* (2013.01); *H02K 7/14* (2013.01);
(Continued)

(58) Field of Classification Search
CPC ...... B65G 47/962; B65G 54/02; B65G 35/06; B65G 2201/0261; H02K 16/04; H02K 7/14; H02K 16/00; H02K 41/031; B23Q 1/26
See application file for complete search history.

(56) References Cited

U.S. PATENT DOCUMENTS 6,326,708 B1 * 12/2001 Tsuboi .................. B60L 15/005 310/12.06
6,703,806 B2 * 3/2004 Joong .................... B23Q 1/626 310/12.05
(Continued)

FOREIGN PATENT DOCUMENTS

CN 102858664 A 1/2013
DE 102012204919 A1 10/2013
(Continued)

*Primary Examiner* — Mark A Deuble
(74) *Attorney, Agent, or Firm* — Dorsey & Whitney LLP

(57) ABSTRACT

A linear transport system can have a carriage guide rail having a first and a second carriage, which are arranged in such a way that they can be moved independently of one another on the carriage guide. The XY table for this linear transport system can comprise a carrying structure and a first and a second linear guide, which are embodied with an angular offset relative to one another and each have a first and a second guide element, e.g., which can be moved relative to one another along a linear track. In one arrangement, the first guide elements of the first and second linear guides are connected to the carrying structure. The second guide element of the second linear guide can be connected to the first carriage and the second guide element of the second linear guide can be connected to the second carriage.

25 Claims, 11 Drawing Sheets

(51) Int. Cl.

| | |
|---|---|
| ***H02K 16/00*** | (2006.01) |
| ***B65G 35/06*** | (2006.01) |
| ***H02K 16/04*** | (2006.01) |
| ***B23Q 1/26*** | (2006.01) |
| ***B65G 47/96*** | (2006.01) |
| ***H02K 41/03*** | (2006.01) |

(52) U.S. Cl.
CPC ............. *H02K 16/00* (2013.01); *H02K 16/04* (2013.01); *H02K 41/031* (2013.01); *B23Q 1/26* (2013.01)

(56) References Cited

U.S. PATENT DOCUMENTS

| | | | | |
|---|---|---|---|---|
| 8,967,051 | B2 * | 3/2015 | King ..................... | B60L 13/003 104/284 |
| 9,096,386 | B2 * | 8/2015 | Staunton .............. | B23Q 7/1447 |
| 2009/0107806 | A1 | 4/2009 | Mendenhall | |
| 2014/0331888 | A1 * | 11/2014 | Wernersbach ........ | B60L 13/006 104/282 |
| 2016/0176659 | A1 * | 6/2016 | Aumann ................ | B65G 54/02 198/619 |
| 2016/0207720 | A1 * | 7/2016 | Hanisch ................. | B65G 54/02 |

FOREIGN PATENT DOCUMENTS

| | | | |
|---|---|---|---|
| KR | 20030006756 | A | 1/2003 |
| KR | 20030013868 | A | 2/2003 |
| KR | 20100117316 | A | 11/2010 |
| WO | 2011131385 | A1 | 10/2011 |
| WO | 2016083394 | A1 | 6/2016 |

* cited by examiner

XY TABLE FOR A LINEAR TRANSPORT SYSTEM

CROSS-REFERENCE TO RELATED APPLICATIONS

This patent application claims priority to international patent application PCT/EP2015/077535, filed Nov. 24, 2015, and German patent application DE 10 2014 117 150.0, filed Nov. 24, 2014, entitled XY-TISCH FÜR EIN LINEARES TRANSPORTSYSTEM, for each of which the entire disclosure and content are hereby incorporated by reference herein, in the entirety and for all purposes.

FIELD

This invention relates to an XY table, and to a linear transport system having such an XY table.

BACKGROUND

Increasing use is being made of linear drive concepts as transport systems in production and manufacture, in which concepts a plurality of transport carriages can be controlled and moved independently of one another on a transfer path, thereby making it possible to achieve a high flexibility in product flow, e.g. in order to perform grouping of products or to allow for different process times. In designing linear drive systems, it has proven advantageous to form the transfer path from energizable magnetic field generators, whereas the carriages move passively in a wireless manner.

A linear drive system of this kind is described in DE 10 2012 204 919 A1. In this linear transport system, a series of magnet coils is arranged along the transfer path, wherein the carriages arranged on the transfer path are provided with permanent magnets. Dynamic activation of the individual coils along the transfer path produces a dedicated traveling field equivalent to a three-phase field for each carriage, which moves the carriage independently of the other carriages. Here, the transfer path together with the individual coils is of modular construction, and can also be embodied as a closed track in order to allow circulating transport.

In linear transport systems, however, movement is possible only in one direction along the transfer path. In a production and manufacturing process, however, a two-dimensional movement, particularly in the region of the workstation, is often required when transporting a workpiece to be processed. The required movement in the second direction is then generally performed by the workstation itself or by a robot or some other actuator associated with the workstation.

To enable a two-dimensional movement to be carried out, there is also the possibility of designing a carriage in a transport system as an XY table, also referred to as a compound table or compound rest. XY tables are two-axis systems comprising two single-axis linear guide systems, which allow movement of an object in two directions within one plane. The XY table carries the workpiece to be processed and can adopt any position within the XY plane through the interaction of the two axes as long as this position is within the capacity for movement of the guide. When an XY table is used in a linear transport system, however, it is necessary to implement a further axis drive on the carriage, e.g. in the form of a motor-driven screw or, alternatively, of a further linear motor in order to be able to perform a two-dimensional movement. However, the consequence of this is that the carriage can no longer be embodied in a passive wireless manner.

US 2009 010 78 06 A1 discloses an XY table of the type in question where an XY table has a carrying structure having two single-axis linear guide systems, which are embodied with an angular offset relative to one another. The two single-axis linear guide systems are each associated with a transport carriage. By a relative movement of the two carriages carrying the XY table relative to one another, the carrying structure can be moved transversely to the transfer path along the two linear guides.

KR 10 2003 006 756 A shows a linear transport system having two carriages, which bring about the movement of a support table through changes in the relative spacing thereof. WO 2011 131 385 A1 discloses linear carriages which can run along the side of a carrying structure.

SUMMARY

It is an object to provide an improved XY table and an improved linear transport system having a curved carriage guide-rail segment, wherein the XY table is of simple construction and can be produced at low cost.

EXAMPLES

One aspect provides a linear transport system comprising a carriage guide rail having a first and a second carriage, which are arranged in such a way that they can be moved independently of one another on the carriage guide. The XY table for this linear transport system comprises a carrying structure and a first and a second linear guide, which are embodied with an angular offset relative to one another and each have a first and a second guide element, which can be moved relative to one another along a linear track. In this arrangement, the first guide elements of the first and second linear guides are connected to the carrying structure. The second guide element of the first linear guide can be connected to the first carriage and the second guide element of the second linear guide can be connected to the second carriage.

This XY table enables the linear transport system for the XY table to be designed with an active energizable transfer path, along which the carriage guide rail is arranged, and passive wireless carriages on the carriage guide rail. The two single-axis linear guide systems of the XY table are each associated with one carriage, and these can be controlled and moved independently of one another. By the synchronous movement of the two carriages supporting the XY table, the XY table can be moved along the transfer path. By a movement of the two carriages supporting the XY table relative to one another, during which the spacing between the carriages is changed, the carrying structure can be moved transversely along the two linear guides relative to the transfer path. Thus, the XY table can assume any desired position in the two-dimensional working space created by the length of the two linear guides.

The XY table itself is of simple construction and can be produced at low cost. The linear transport system having the XY table can be used in a production and manufacturing process in which an XY movement in a workstation and, at the same time, transport over a relatively long distance are required. In this case, the XY table with the workpiece to be processed can move successively to a plurality of workstations without reloading. The workstations themselves do not need any additional actuators to perform a two-dimensional movement.

In order to allow free configuration, even curved configuration, of the transfer path of the linear transport system and, in particular, to enable even a closed carriage guide rail to be implemented, the XY table is embodied in two variants.

In a first variant, to move the carriages along a curved carriage guide rail segment, the first and second linear guides of the XY table are oriented parallel to the track plane of the carriage guide rail, wherein the first guide elements of the first and second linear guides are connected to the carrying structure and/or the second guide elements of the first and second linear guides are connected to the first and second carriages respectively in a manner which allows rotation in the track plane of the carriage guide rail. In this variant, the carrying structure of the XY table is moved parallel to the track plane of the linear transport system, wherein travel along a curve is made possible by the rotatable mounting on the two carriages. Here, the rotation device can be provided between the two linear guides and the two carriages or the two linear guides of the carrying structure. It is preferred here to embody the rotation devices in the form of rotary joints between the first and second carriages and the first and second guide elements of the first and second linear guides, thereby giving a compact construction.

According to a second variant of the XY table, the first and second linear guides are oriented in a plane of orientation perpendicular to the track plane of the carriage guide rail, wherein the first guide elements of the first and second linear guides are connected to the carrying structure and/or the second guide elements of the first and second linear guides are connected to the first carriage and second carriage respectively in a manner which allows tilting in the plane of orientation. In this variant, the XY table can be moved along the transfer path perpendicularly to the track plane of the linear transport system, wherein the tilting movement of the XY table in the plane of orientation relative to the two carriages makes it possible to travel along a curve. Here, the tilting device can once again be arranged between the two linear guides and the carrying structure or between the two linear guides and the two carriages. However, it is preferred to embody the tilting device in the form of two U profiles which are arranged rotatably on the carriages, parallel to the track plane, and carry the two guide elements of the first and second linear guides. With this embodiment, a compact construction of the XY table is achieved.

According to another aspect of the XY table, the first guide elements of the first and second linear guides are each guide rails, and the second guide elements of the first and second linear guides are each sliding elements. By this design of the linear guides, a low-cost construction of the XY table is possible. The guide rails for the XY table can be arranged at any desired angle relative to one another on the carrying structure and oriented at any desired angle relative to the sliding elements to be arranged on the carriages. The desired possibilities of movement for the XY table can thus be obtained in a simple manner.

According to another aspect, the XY table has a tilting device having a tilting joint, on which a triggering element is secured. A further carriage having a tilting element is provided on the carriage guide rail of the transport system, said tilting element being designed to actuate the tilting joint on the XY table upon engagement with the triggering element in order to bring about a tilting movement of the carrying structure of the XY table. In this embodiment, it is possible, in addition to the two-dimensional movement of the XY table, for a movement in the third dimension in the form of a tilting process of the carrying structure to be carried out. The XY table can thus be used to separate out a workpiece being transported on the linear transport system, for example. Here, the tilting process is controlled by the linear transport system itself in that the further carriage having the tilting element brings about the tilting movement of the carrying structure in interaction with the triggering element on the tilting joint of the XY table. The triggering mechanism is of simple construction and can be implemented as part of the linear transport system without major additional outlay.

According to another aspect, the XY table has a third linear guide, which is arranged between the second guide elements of the first and second linear guides and the first and second carriages respectively and is designed to move the first and second carriages relative to one another along a linear track. With the further linear guide there is the possibility of producing an additional connection between the two carriages, which carry the XY table, of the linear transport system, thereby enabling increased stability of the system to be achieved. It is preferred here to embody the third linear guide with a guide rail and a sliding element, wherein the guide rail is connected to one carriage and the sliding element is connected to the other carriage. In order to achieve a relative movement between the two carriages and hence a two-dimensional movement of the XY table, it is thus necessary to move only one carriage, namely the one which guides the sliding element, thereby making it possible to achieve a compact construction.

The carriage guide rail of the linear transport system can be embodied as a closed track, thereby enabling a circulating transport motion to be carried out with the XY table. According to one embodiment, the linear transport system is embodied in such a way that the carriage guide rail is arranged on a stator, which has a series arrangement of individually energizable coils, wherein the carriages each comprise at least one permanent magnet, which is designed to interact with the magnetic field formed by the series arrangement of individually energizable coils. In this embodiment of the linear transport system, dynamic activation of the individual coils is possible, thus allowing a dedicated traveling field equivalent to a three-phase field to be produced for each carriage in order to move the carriage and thus carry out the desired movement of the XY table in a simple manner.

BRIEF DESCRIPTION OF THE DRAWINGS

The invention is explained in greater detail below on the basis of preferred exemplary embodiments with reference to figures, in which.

The same reference symbols can be used for the same features below. Furthermore, for the sake of clarity, provision is made for not all features to always be depicted in all drawings. A placeholder in the form of a geometric object is sometimes used for a group of features, for example.

DETAILED DESCRIPTION

Figure 1:
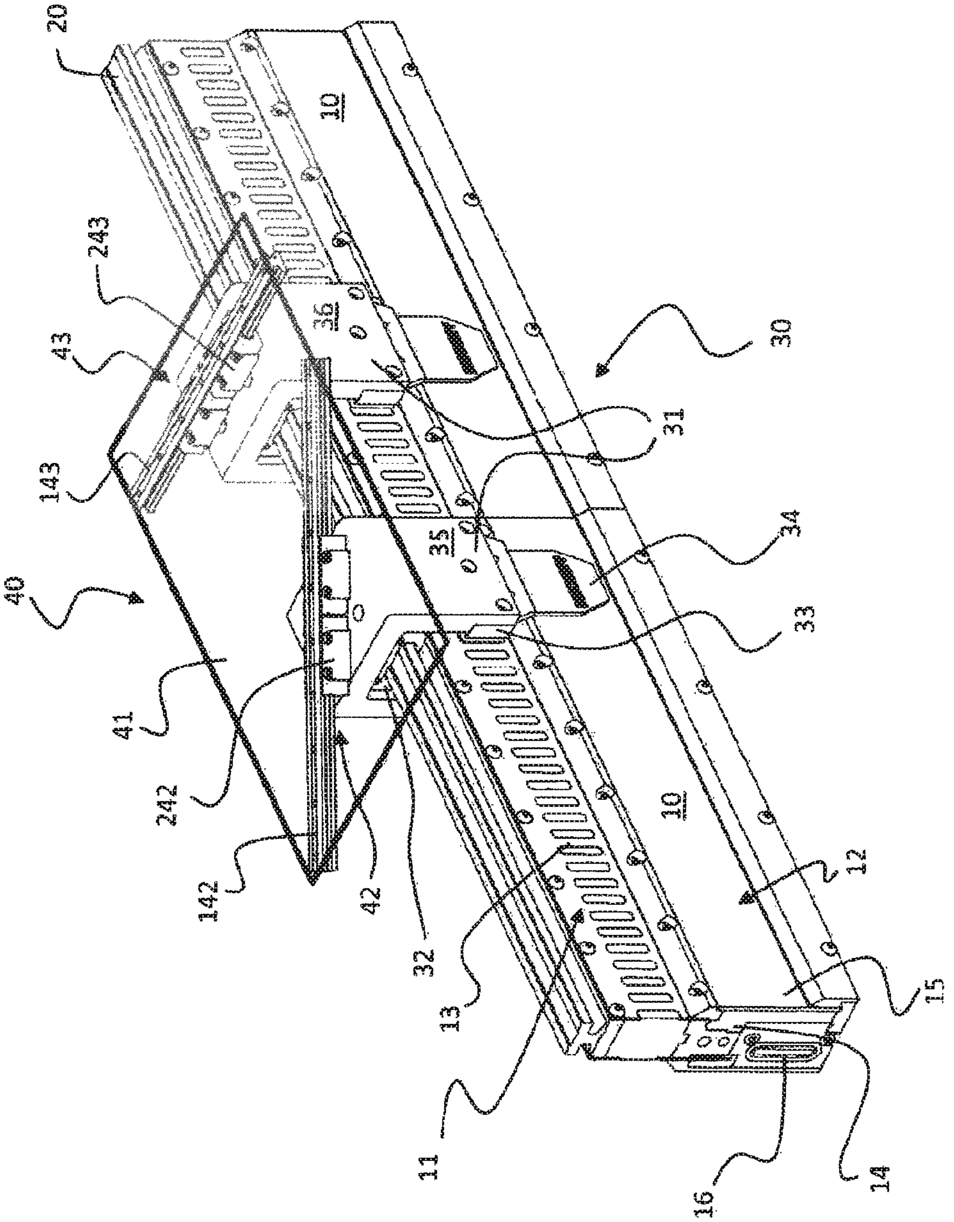
FIG. 1 shows a straight motor module arrangement of a linear transport system having an XY table in perspective view.

In production and manufacture, especially with distributed workstations, transport systems play an important role. One significant theme here is to achieve high flexibility in the transport of the workpieces to be processed between the individual workstations. Particularly suitable for this purpose are linear transport systems, in which a plurality of carriages that can be moved independently of one another can be moved along a guide.

There is a preference here for linear transport systems in which the motor is arranged in the transfer path, whereas the carriages are embodied so as to be passive and wireless. With such linear drive systems it is possible to achieve long transport distances. It is then furthermore also possible to form a closed transfer path in order to achieve a circulating transport movement. The invention is explained below by a linear transport system of this kind having a motor arranged in the transfer path and wireless carriages. However, there is also the possibility of using a linear transport system in which the motor is implemented in the carriages. In addition to the electric drive shown, a drive system of some other kind, e.g. a hydraulic or a pneumatic drive, can be used.

The linear transport system shown in the figures is constructed as a linear motor, in which individual coils are arranged along a transfer path. The transfer path furthermore has a carriage guide rail, on which the movable carriages are movably arranged. In this arrangement, the movable carriages are fitted with permanent magnets. By the dynamic activation of the individual coils along the transfer path, a dedicated traveling field equivalent to a three-phase field is produced for each carriage, by which the carriages can be moved separately.

The linear transport system has a stator, which comprises the series arrangement of individually energizable coils. In this case, the stator is shaped to correspond to the desired transfer path and carries a carriage guide rail. Arranged on the carriage guide rail are the carriages, which are each provided with permanent magnet plates. A position detection system, which is preferably integrated into the stator, is furthermore provided. The signals of the position detection system are transmitted to a control unit via a communications link. From these position signals, the control unit determines the position and speed of the individual carriages. The control unit then furthermore specifies the current for the individual coils in the stator, by which the coils then individually produce a dedicated magnetic traveling field for the individual carriages in order to bring about a desired onward traveling movement of the individual carriages. The linear drive system thus enables each individual carriage to be positioned accurately in a time-synchronized manner within microseconds under position and speed control.

The stator consists of individual motor modules, which are arranged in a row to form the transfer path. The motor modules can be of straight or, alternatively, of arc-shaped design. Through appropriate combination of straight and arc-shaped motor modules it is possible to form any desired shape of the transfer path, in particular also a closed transfer path.

FIG. 1 shows a linear transport system having two motor module segments 10. Each motor module 10 has a coil region 11, which is arranged on a support region 12. The coil region 11 consists of a series of transversely arranged coils 13, which are each connected to power electronics 14 integrated into the support region 12 for the purpose of activation. A position detector 15 is furthermore provided in a wall of the support region 12. The power electronics 14 and the position detector 15 of the individual motor modules are connected by a contact device 16, which is arranged laterally in the support region 12 and which consists, on the one hand, of a projecting contacting plate and, on the other hand, of a contact slot. As an alternative, it is also possible for each motor module 10 to have a contact slot on both sides, into which it is possible to insert an additional connecting board, which couples two adjacent motor modules 10 to one another and thus forms the contact device 16. A feed, by which data communication with the control system and connection to the power supply is accomplished, is furthermore provided on individual motor modules 10.

The carriage guide rail 20 is arranged on the coil region 11 of the motor modules 10. This rail is preferably likewise of modular construction and segmented to match the motor modules. However, it is also possible for the carriage guide rail 20 to extend over several motor modules 10. Here, the geometry of the carriage guide rail 20 is matched to the running gear of the carriages guided on the carriage guide rail 20.

FIG. 1 shows a double carriage arrangement 30, which is arranged on the carriage guide rail 20 and is used as a drive for an XY table. The carriages 35, 36 of the double carriage arrangement 30 each have a support profile 31 of U-shaped cross section, which fits around the carriage guide rail 20 and the coil region 11, situated below the latter, of the motor module 10. Arranged within the carriage support profile 31, in the region of the guide rail, is a running roller system 32 as a running gear, the embodiment of which is matched to the geometry of the carriage guide rail 20, thereby providing good running characteristics and low wear. As an alternative, it is also possible for a system comprising suitable sliding elements to be brought into engagement with the carriage guide rail 20 instead of the running roller system 32.

Opposite the coil region 11 of the motor modules 10, the carriage support profiles 31 each have a permanent magnet plate arrangement 33 on the inside. The permanent magnets interact with the coils 13 in the coil region 11, wherein the magnetic traveling field formed by the coils 13 exerts a propulsive force on the carriages through interaction with the permanent magnet in order to adjust the position and speed of said carriages in a controlled manner.

Adjoining one arm of the carriage support profile 31, opposite the position detector 15, is a transmitter lug 34. The position detector 15 is designed as an inductive sensor system, in which the transmitter lug 34 of the carriage causes a disturbance which is converted by the position detector 15 into a position signal.

Fundamentally, the linear transport system allows a single-axis movement along the transfer path. By the carriage of the linear transport system, it is possible to move workpieces that are be processed in a production and manufacturing process from workstation to work-station. However, a two-dimensional movement of the workpieces is often necessary to process the workpieces in the workstations. Since the carriages in the linear transport system can be moved only in one direction, it is generally necessary for this purpose to reload the workpieces in the workstations. This can be avoided with an XY table for the linear transport system.

The XY table has a carrying structure to receive the workpieces to be processed. Also provided are a first and a second linear guide, which are embodied with an angular offset relative to one another and each have a first and a second guide element, which can be moved relative to one another along a linear track. The first guide element of the first and second linear guides is connected to the carrying structure of the XY table. The second guide element of the first linear guide is connected to a first carriage, and the second guide element of the second linear guide is connected to a second carriage of the linear transport system. By pushing the two carriages together or apart, a movement of the XY table transversely to the transfer path can then be performed in addition to a movement of the XY table along the transfer path of the linear transport system. The XY table thus makes it possible to perform a two-dimensional movement, even in the context of a linear transport system. The movement in the X direction is performed by jointly moving the two carriages of the double carriage arrangement supporting the XY table, while the movement in the Y direction is performed by moving the two carriages relative to one another.

FIG. 1 shows a first embodiment of an XY table for use in a linear transport system having a straight transfer path. The XY table 40 has a carrying structure 41 and a first and second linear guide 42, 43. In FIG. 1, the carrying structure 41 is designed as a flat plate and can carry objects, e.g. workpieces to be processed. However, there is also the possibility of using carrying structures of different design, especially those which have holding devices matched specifically to the objects to be transported, instead of a plate.

The two linear guides 42, 43 each consist of a first guide element, which is designed as a guide rail 142, 143, and a second guide element, which is designed as a sliding element 242, 243. The two guide rails 142, 143 are mounted on the underside of the carrying structure 41, which is designed as a plate, with an angular offset relative to one another. In order to achieve a large XY range of movement, one guide rail, the guide rail 143 of the second linear guide 43 in the embodiment shown in FIG. 1, is mounted parallel to a broad side of the carrying structure 41 designed as a plate. In contrast, the other guide rail, the guide rail 142 of the first linear guide 42 in the embodiment shown in FIG. 1, extends diagonally across the underside of the carrying structure 41 designed as a plate.

The sliding element 242 of the first linear guide 42 is arranged on the carriage support profile 31 of the first carriage 35 of the double carriage arrangement 30, and the sliding element 243 of the second linear guide 43 is arranged on the carriage support profile 31 of the second carriage 36 of the double carriage arrangement 30. Here, the orientation of the sliding elements on the carriage support profiles is matched to the orientation of the associated guide rails of the linear guides. In the embodiment shown in FIG. 1, the sliding element 243 of the second linear guide 43 is therefore oriented transversely to the carriage guide rail 20 on the carriage support profile 31 of the second carriage 36 in order to guide the guide rail 143, mounted transversely on the carrying structure 41, of the second linear guide 43. In contrast, the sliding element 242 of the first linear guide 42 is arranged diagonally with respect to the carriage guide rail 20 on the carriage support profile 31 of the first carriage 35 in order to interact with the diagonally arranged guide rail 142 of the first linear guide 42 under the carrying structure 41.

In the embodiment shown in FIG. 1, the sliding elements 242, 243 are each of two-part design. Instead of a multi-part configuration of this kind, it is also possible to use single-part sliding elements. In the case of the multi-part configuration, the individual parts of the sliding elements can also be arranged spaced apart from one another on the carriage support profile. The sliding elements 242, 243 and the guide rails 142, 143 of the first and second linear guides 42, 43 are configured in such a way that a substantially frictionless low-wear linear movement is made possible. In the embodiment shown in FIG. 1, the guide rails have an I profile and the sliding elements have a C profile. In this arrangement, the C profile of the sliding elements engages in the recesses in the I profile of the guide rails. In order to ensure low-friction sliding, it is also possible for additional ball bearings to be provided in the sliding element. There is furthermore also the possibility of arranging the guide rails of the first and second linear guides on the carriages instead of the sliding elements, while the sliding elements are then arranged on the carrying structure instead of the guide rails.

Figure 2A:
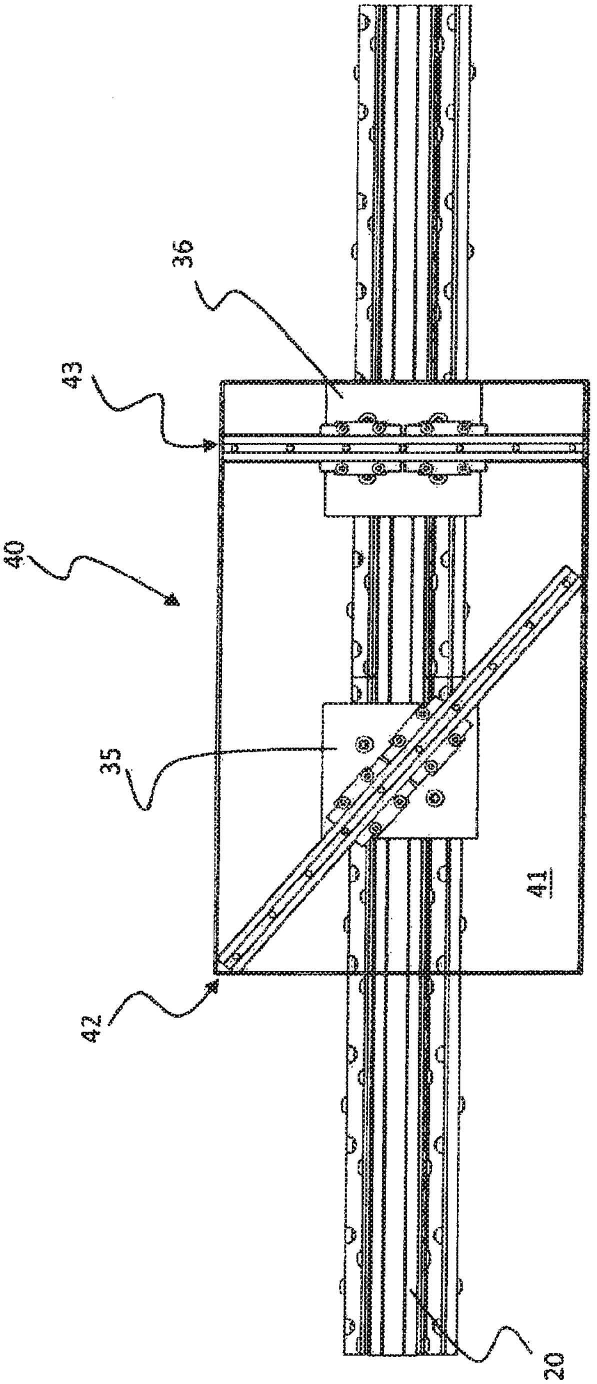
FIGS. 2A, 2B and 2C show plan views of the XY table shown in FIG. 1 in three different positions.
Figure 2B:
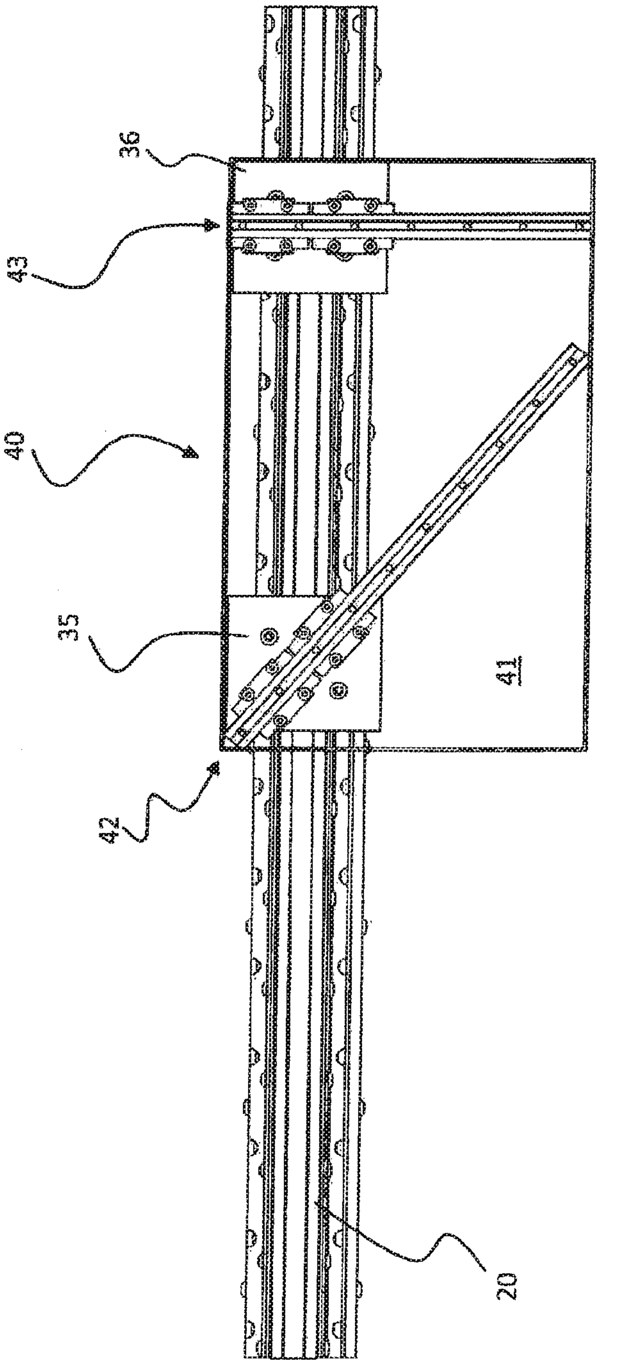
Figure 2C:
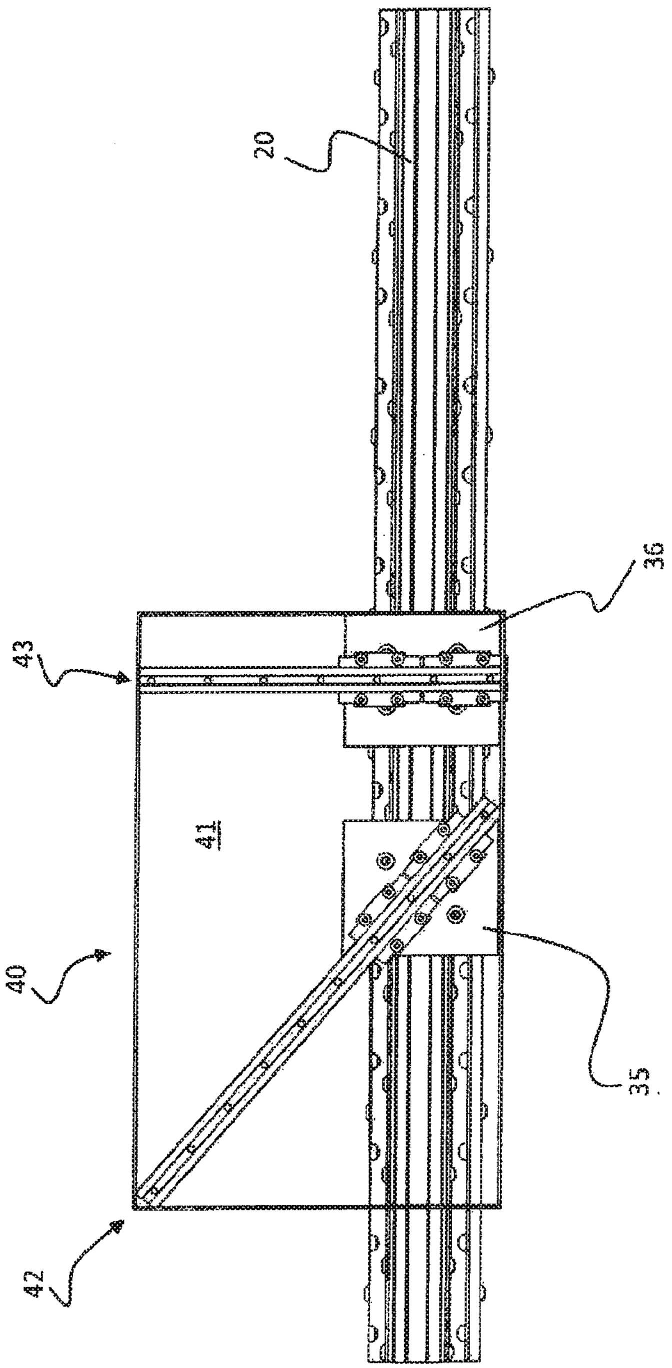

FIGS. 2A, 2B and 2C show the XY table 40 in various XY positions in plan view, wherein FIG. 2A shows the XY table 40 in a symmetrical position in relation to the carriage guide rail 20, corresponding to the illustration in FIG. 1, in which position the carrying structure 41 is arranged centrally above the carriage guide rail 20. FIGS. 2B and 2C then show the XY table 40 in the respective positions moved by the maximum amount to the left and right relative to the carriage guide rail 20. The positioning of the XY table 40 is accomplished by moving the first and second carriages 35, 36. A movement in the X direction along the carriage guide rail 20 is achieved by synchronous movement of the two carriages 35, 36 carrying the XY table. A movement of the two carriages relative to one another is used to provide a movement in the Y direction transversely to the carriage guide rail 20. In the XY table position shown in FIG. 2B, the two carriages 35, 36 of the double carriage arrangement have be moved apart to the maximum extent. In the position of the XY table 40 shown in FIG. 2C, in contrast, the two carriages 35, 36 of the double carriage arrangement are at a minimum distance from one another.

The XY table 40 shown in FIGS. 1, 2A, 2B, 2C for a linear path is distinguished by a simple construction and can furthermore be positioned with little control effort. Since the position of the XY table 40 is determined by the two carriages 35, 36 of the linear drive system which carry the table, control of the movement of the XY table 40 can be carried out fully within the scope of carriage control.

The XY table 40 could be used as follows in a production and manufacturing system, for example: the XY table 40 is loaded with the workpiece to be processed at one end of the carriage guide rail 20. From there, the XY table 40 is then moved with the workpiece to the workstations arranged along the carriage guide rail 20 by synchronous movement of the two carriages 35, 36 of the double carriage arrangement. In the workstations, the XY table can then additionally perform a transverse movement by appropriate alteration of the distance between the two carriages 35, 36 of the double carriage arrangement 30. If the workstation is a compressed air cleaning station, for example, the XY table 40 with the workpiece can perform a zigzag movement under a compressed air nozzle in order to clean the workpiece. If the workpiece is a container, for example, on which a lid is to be placed, the container can then be moved on after cleaning to an adhesive bonding station, in which adhesive is to be applied to the container rim with the aid of a fixed adhesive bonding nozzle. For this purpose, the XY table 40 with the container is then moved in such a way, by appropriate control of the two carriages 35, 36 of the double carriage arrangement carrying the XY table 40, that the container rim is guided along under the fixed adhesive bonding nozzle. The container can then be transported to a lid dispensing station, in which the lid is pressed onto the container. For better connection of the two parts, the container can then perform a circular movement under a contact pressure device by appropriate movement of the XY table 40. Following this, the container with the lid can then be transported to a UV station for curing.

The linear transport system with a straight line path and XY table 40 is also suitable for transporting workpieces to a workstation that poses a hazard to people. By the linear drive system, it is possible to produce a clearance with respect to this potentially hazardous zone. In this case, the hazardous zone can be separated off by a shield consisting of two screens offset relative to one another. The XY table 40 can then guide a workpiece past this shield by a right-left movement. Such a configuration makes it possible to dispense with a movable protective grille for shielding the hazardous zone.

Figure 3:
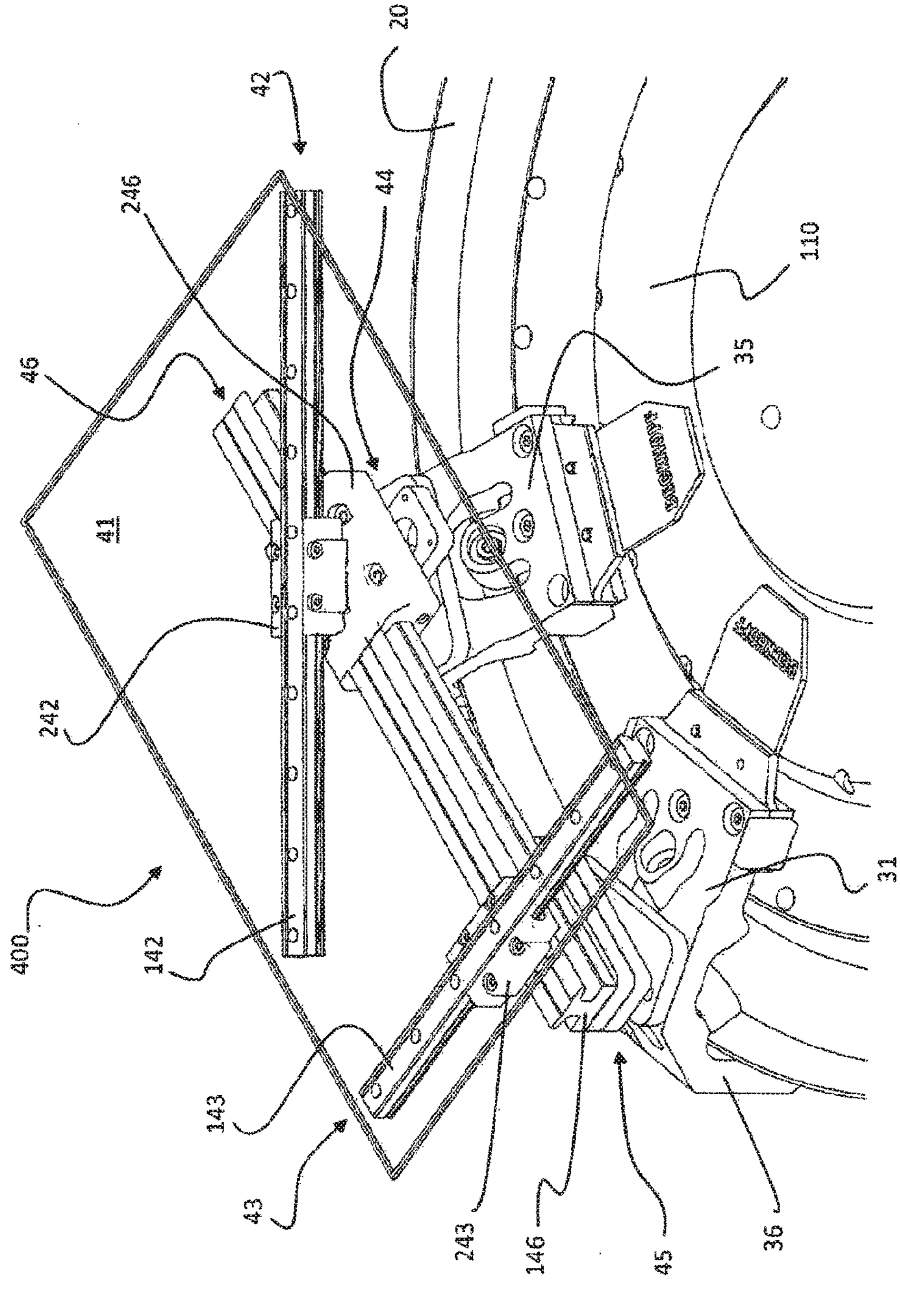
FIG. 3 shows a curved segment of a linear transport system having one embodiment of an XY table in perspective view.

When using linear drive systems in manufacture and production for transporting workpieces, endlessly circulating transport movements are often desired. In such linear drive systems with a closed transfer path, however, the carriages must travel around bends. FIG. 3 shows the linear drive system with the construction explained with reference to FIG. 1, comprising a curved segment. FIG. 3 furthermore shows a design of an XY table 400 which is carried by a double carriage arrangement and can travel through the curved segment. The curved motor module 110 is arranged horizontally in FIG. 3. The XY table 400 is moved parallel to the track plane of the curved motor module 110, said plane being defined by the carriage guide rail 20. The first and second linear guides 42, 43 of the XY table 400 are oriented parallel to the track plane of the curved motor module 110. At the same time, as FIG. 3 shows, the sliding elements 242, 243 of the first and second linear guides 42, 43 are arranged laterally on the carriage support profile 31 of the first and second carriage 35, 36, respectively, of the double carriage arrangement 30.

Respective rotary joints 44, 45 are furthermore provided between the sliding elements 242, 243 of the first and second linear guides 42, 43 and the carriage support profile 31 of the first and second carriage 35, 36, respectively. In the embodiment shown in FIG. 3, the rotary joints 44, 45 in each case have two joint plates with a common center of rotation, wherein one joint plate is arranged on the carriage support profile 31 and the other joint plate is connected to the sliding elements 242, 243 of the first and second linear guides 42, 43, respectively.

In order to achieve improved stability of the XY table 400, a further linear guide 46, which connects the two carriages 35, 36 carrying the XY table to one another, is provided in the embodiment shown in FIG. 3. The third linear guide 46 once again has a guide rail 146 and a sliding element 246. Here, the guide rail 146 and the sliding element 246 of the third linear guide 46 are of similar design to the first and second linear guides 42, 43, although the sliding element 246 of the third linear guide 46 completely surrounds the guide rail 146. Here, the length of the guide rail 146 corresponds at least to the XY table length.

The guide rail 146 of the third linear guide 46 is arranged between the sliding element 243 of the second linear guide 43 and the rotary joint 45 of the second carriage 36, wherein the guide rail 146 is firmly connected to the underside of the sliding element 243 of the second linear guide 43 and to the upper rotary joint plate of the rotary joint 45 of the second carriage 36. The sliding element 246 of the third linear guide 46 is arranged between the sliding element 242 of the first linear guide 42 and the rotary joint 44 of the first carriage 35 and is secured on the underside of the sliding element 242 and the upper rotary joint plate of the rotary joint 45 of the first carriage 35. In this arrangement, the guide rail 146 of the third linear guide 46 passes through the sliding element 246 of the third linear guide 46, thus allowing the sliding element 242 of the first linear guide 42 to be moved together with the sliding element 246 of the third linear guide 46.

By virtue of the additional connection of the two carriages 35, 36 carrying the XY table 400 via the third linear guide 46, increased stiffness of the XY table structure is achieved, especially when traveling around curves. Moreover, the positive guidance of the two carriages 35, 36 by the third linear guide 46 ensures more precise transmission of the carriage movement to the translational movement of the carrying structure 41 of the XY table 400. Depending on the design of the linear drive system and of the XY table 400, especially as regards the curve radii and the table width, it is quite possible to dispense with the third linear guide 46.

Figure 4:
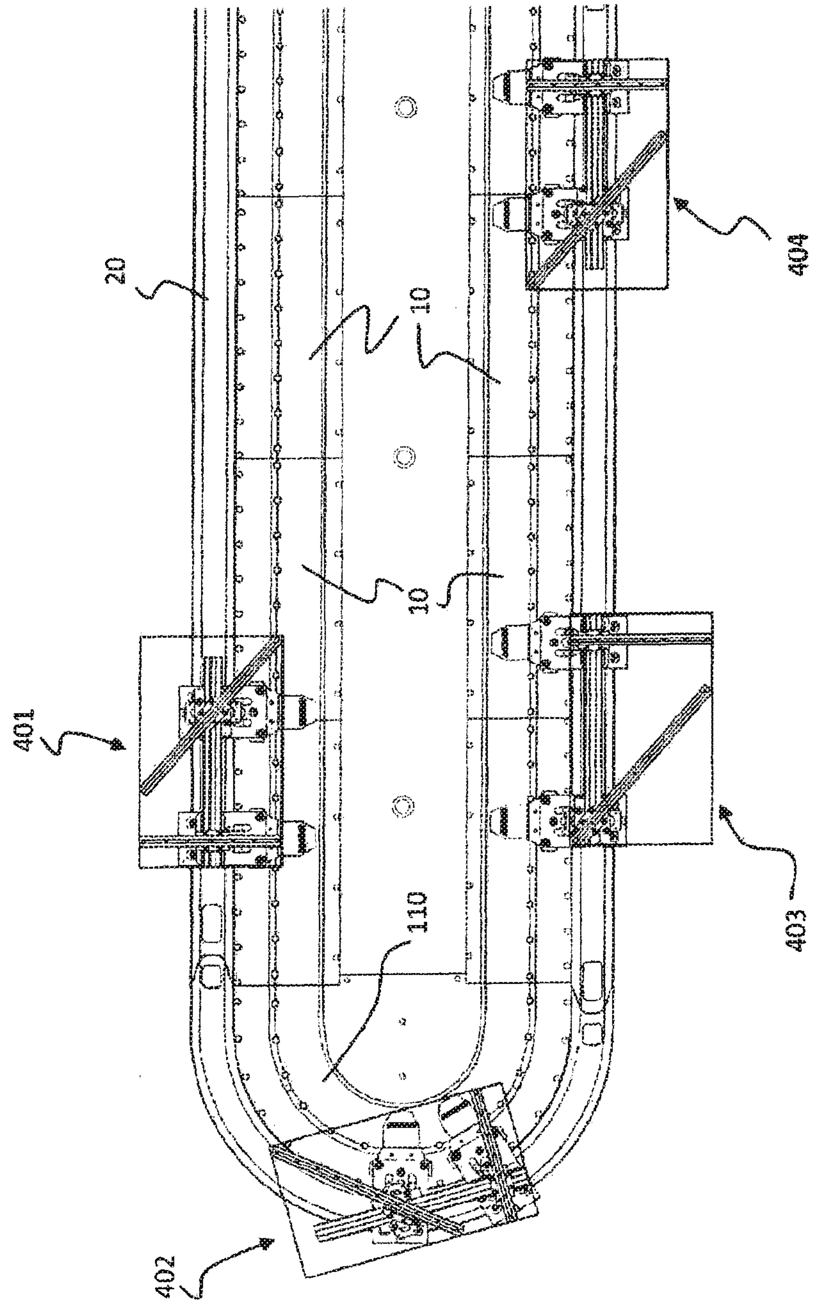
FIG. 4 shows a plan view of a linear transport system having a curved segment, on which four XY tables embodied in the manner shown in FIG. 3 are arranged.

In comparison with FIG. 3, FIG. 4 shows a larger segment of the closed linear transport system having the curved motor module 110 and straight motor modules 10 adjoining the latter. Furthermore, four XY tables 401, 402, 403, 404 are illustrated in the embodiment shown in FIG. 3, wherein the carrying structures of the four XY tables 401, 402, 403, 404 are situated in different positions in relation to the carriage guide rail 20. In the case of XY tables 401, 402, the carrying structure is in a central position in relation to the carriage guide rail. XY tables 403, 404 show carrying structure positions which are each offset transversely to the carriage guide rail 20.

Figure 5:
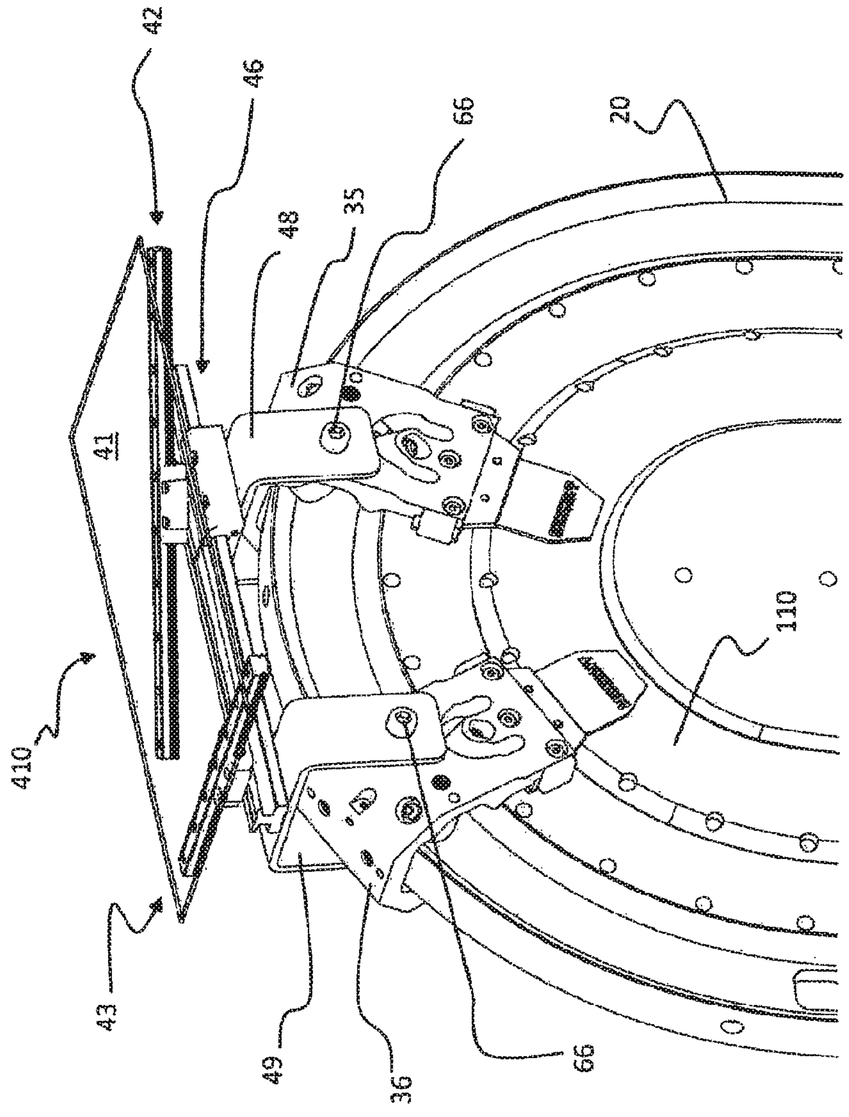
FIG. 5 shows a curved segment of a linear transport system having another embodiment of an XY table in perspective view.

FIG. 5 shows another possible embodiment of an XY table 410, which can be operated on a linear transport system having curved segments. Similarly to the XY table shown in FIG. 1, the carrying structure 41 of the XY table 410 is guided along the end face of the carriage guide rail 20 of the curved motor module 110. The first and second linear guides 42, 43 of the XY table 410 are therefore situated in a plane of orientation perpendicular to the track plane bounded by the carriage guide rail 20. In order to enable the XY table 410 to travel around a curve, the sliding elements 242, 243 of the first and second linear guides 42, 43 are connected to the first and second carriages 35, 36 in a manner which allows tilting in the plane of orientation. In the embodiment shown in FIG. 5, this tilting movement is made possible by two pivoting frames 48, 49 of U-shaped cross section, which each fit around the support profile 31 of the first and second carriage 35, 36, respectively, and are secured on both side faces of the carriage support profile in such a way as to be rotatable about the center of rotation 66. The XY table 410 having the first and second linear guides 42, 43 is then arranged on the front face of the U profile of the two pivoting frames 48, 49.

In the embodiment of the XY table 410 shown in FIG. 5, similarly to the embodiment shown in FIG. 3, a third linear guide 46 serving as a positive guide is provided between the two carriages 35, 36 of the double carriage arrangement 30, connecting the U profiles of the two pivoting frames 48, 49 to one another. However, a structure without an interposed third linear guide is also possible, in which the U-shaped pivoting frames are connected directly to the sliding elements 242, 243 of the first and second linear guides 42, 43 of the XY table 410.

Figure 6A:
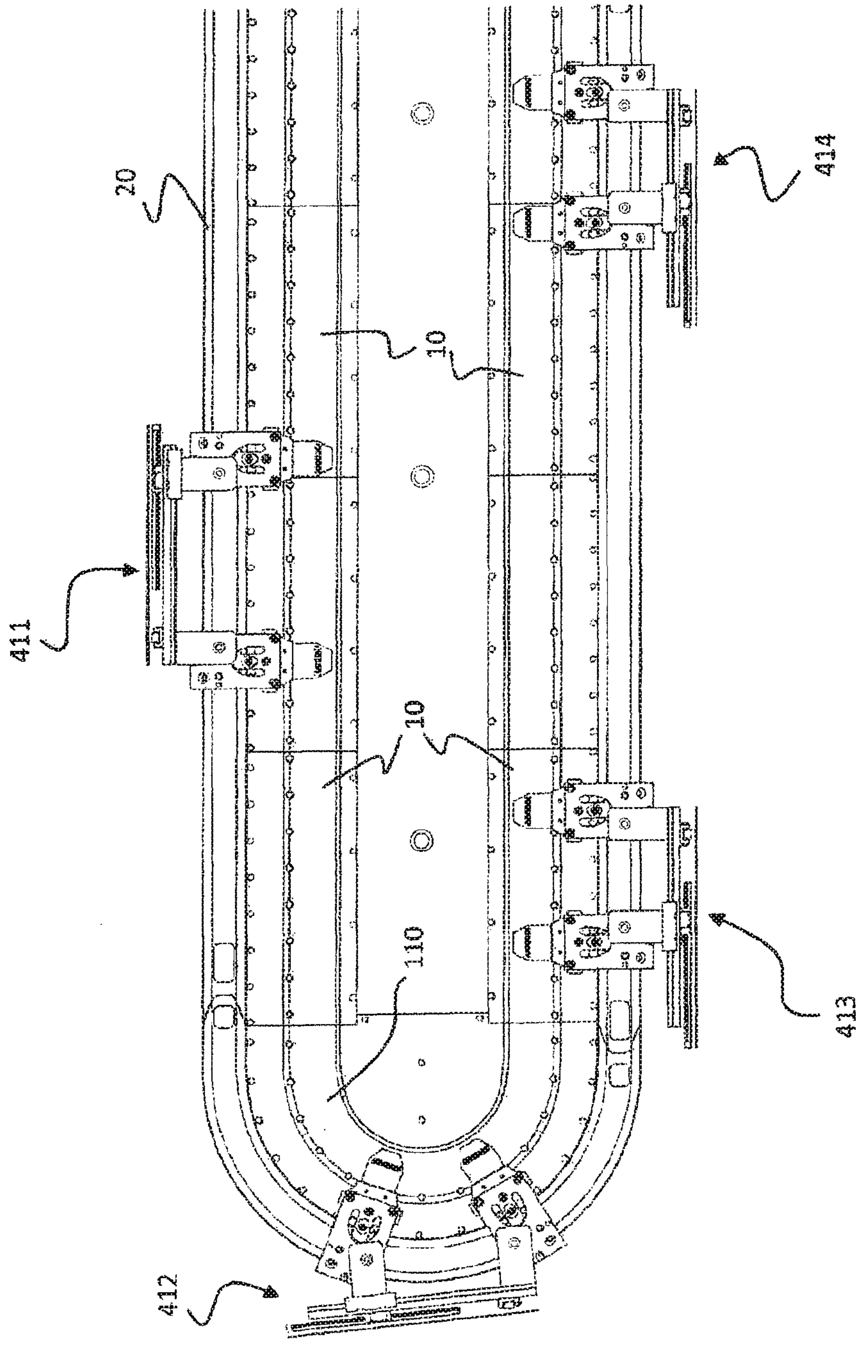
FIGS. 6A and 6B show a plan view and a side view of a linear transport system having a curved segment, on which four XY tables embodied in the manner shown in FIG. 3 are arranged.
Figure 6B:
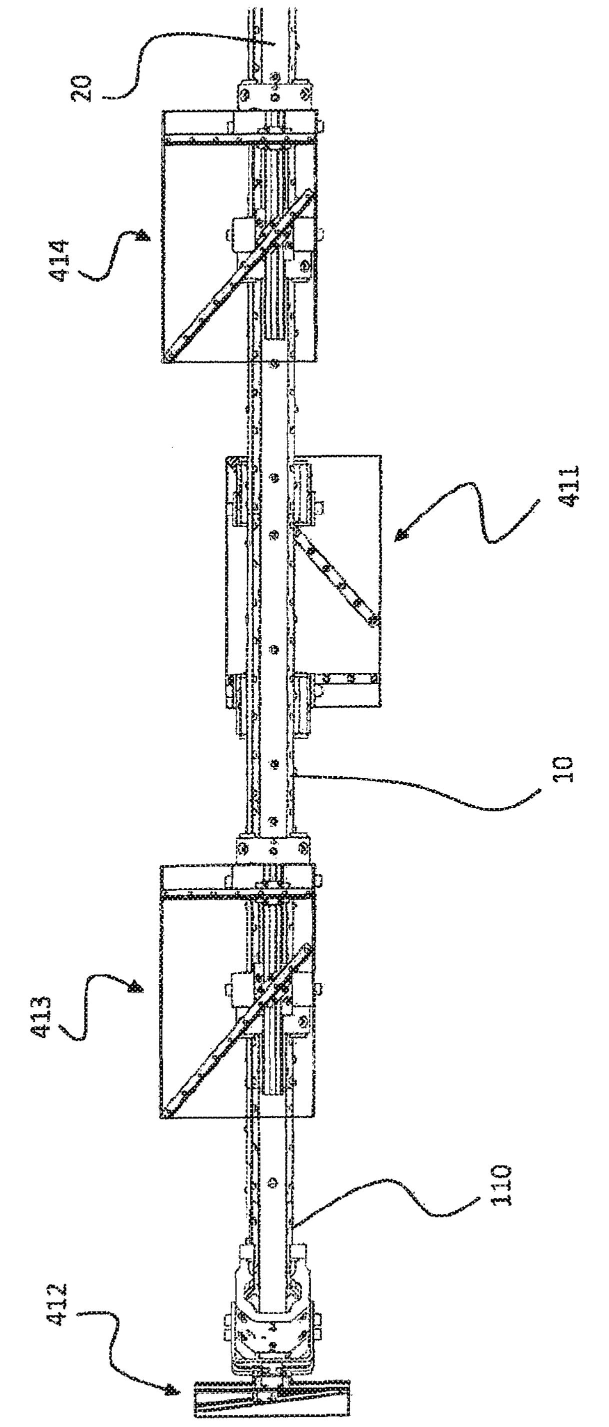

FIGS. 6A and 6B, similarly to FIG. 4, show a larger segment of the closed linear transport system having the curved motor module 110 and straight motor modules 10 adjoining the latter. Four XY tables 411, 412, 413, 414 with the carrying structure in different positions relative to the carriage guide rail 20 are furthermore shown. FIG. 6A represents a side view and FIG. 6B represents a plan view. As FIG. 6B shows, the carrying structure on XY tables 411, 413, 414 is offset relative to the central position over the carriage guide rail 20. In contrast, the carrying structure of XY table 412 is arranged symmetrically over the carriage guide rail 20.

The linear transport system having curved motor modules and an XY table embodiment of the kind shown in FIGS. 3 and 5 is suitable not only for use in production and manufacturing processes in which circulating transport is desired but also especially for transporting workpieces in the safety zone. Thus, a linear transport system of this kind can be used to move a workpiece behind a protective wall after a curve, for example. The operator of the linear transport system is then reliably protected from the zone behind the protective wall, in which there may be dangerous radiation, for example, since there is no visual link with this zone, in contrast to a straight segment.

Figure 7A:
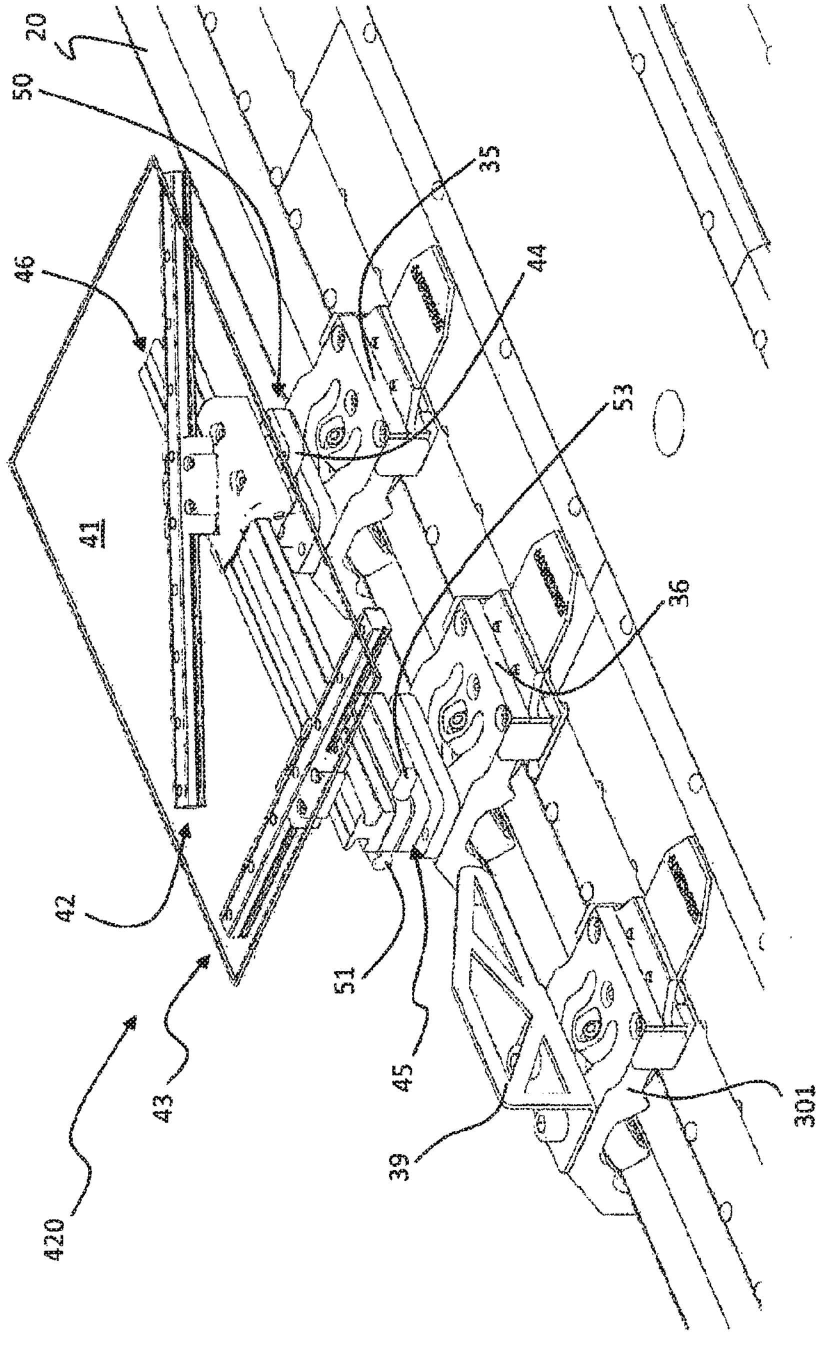
FIGS. 7A and 7B show a segment of a linear transport system having another embodiment of the XY table with a tilting device in perspective view, wherein the figures show the sequence of a tilting movement with the aid of a tilting element arranged on a further carriage.
Figure 7B:
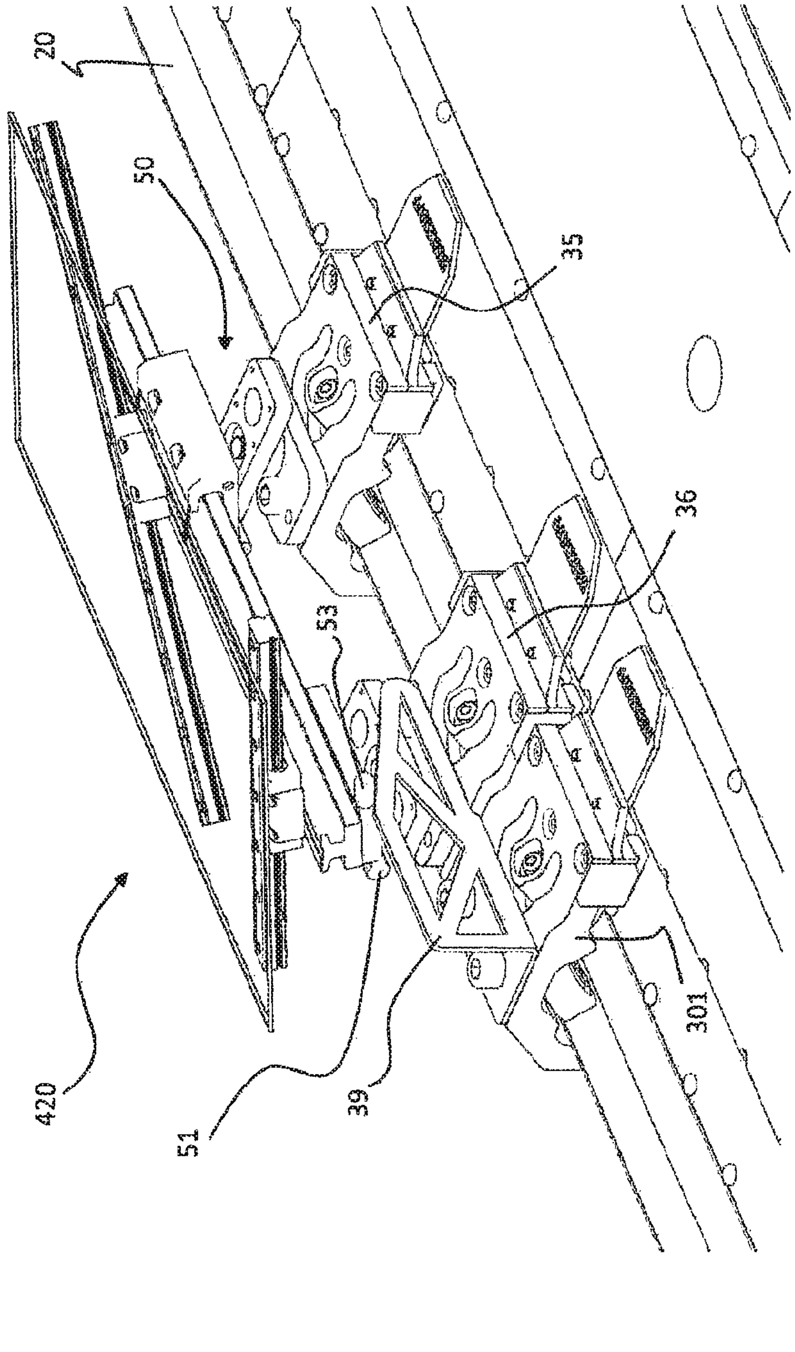

FIGS. 7A and 7B show an embodiment of the XY table with an additional tilting function, which can be used, for example, to unload workpieces situated on the carrying structure of the XY table. In principle, an additional tilting device of this kind for the XY table can be embodied either between the first guide elements of the first and second linear guides and the carrying structure of the XY table or between the second guide elements of the first and second linear guides and the first and second carriages of the double carriage arrangement, wherein the tilting device is generally designed to be tiltable transversely to the carriage guide rail.

The XY table structure 420 shown in FIGS. 7A and 7B largely corresponds to the embodiment shown in FIG. 3, in which the carrying structure is arranged parallel to the track plane defined by the carriage guide rail 20 and in which a rotary joint is provided laterally on each of the two carriages of the double carriage arrangement. Between the rotary joints 44, 45 and the third linear guide 46 there is in each case additionally a hinge joint 50, 51, which connects the upper rotary joint plate of the rotary joints to the guide rail 146 or the sliding element 246 of the third linear guide 46 of the XY table.

Here, the hinge joints 50, 51 are embodied in the form of flaps, wherein the lower flap plate is in each case formed by the upper rotary joint plate. In order to initiate the tilting movement, a guide pin 53, by which the upper flap plate can be raised and the tilting process initiated, is arranged on the upper flap plate to the side of the hinge joint 51 of the second carriage 36, opposite the joint side.

To initiate the tilting movement, a further carriage 301 is arranged on the linear transport system, said carriage carrying a raising device 39, which projects laterally from the carriage support profile and has the shape of a right trapezoid having a ramp projecting above the carriage. As FIGS. 7A and 7B show, the ramp of the raising device 39 can be pushed under the guide pin 53 on the hinge joint 51 of the second carriage 36 by moving the third carriage 301 toward the second carriage 36, wherein the upper flap plate is raised and hence the tilting process initiated.

The initiation of the tilting process of the XY table 420 by an additional carriage makes it possible, in a manner similar to the two-dimensional movement of the XY table, to carry this out directly with the linear drive system itself, making a separate control system unnecessary. However, initiation of the tilting movement can also be accomplished by a corresponding device on a workstation.

What is claimed is:

1. An XY table for a linear transport system, having a carriage guide rail and a first and a second carriage, which are arranged in such a way that they can be moved independently of one another on the carriage guide rail, which has a curved portion, comprising a carrying structure and a first and a second linear guide, which are embodied with an angular offset relative to one another and each have a first and a second guide element, which can be moved relative to one another along a linear track, wherein the first guide elements of the first and second linear guides are connected to the carrying structure, and wherein the second guide element of the first linear guide can be connected to the first carriage and the second guide element of the second linear guide can be connected to the second carriage, wherein, when the first and the second linear guide are oriented parallel to the track plane of the carriage guide rail, the first guide elements of the first and second linear guides are connected to the carrying structure, the first guide elements being allowed rotation in the track plane of the carriage guide rail, and/or the second guide element of the first linear guide is connected to the first carriage, and the second guide element of the second linear guide is connected to the second carriage, the second guide elements being allowed rotation in the track plane of the carriage guide rail, or wherein, when the first and the second linear guide are oriented in a plane of orientation perpendicular to the track plane of the carriage guide rail, the first guide elements of the first and second linear guides are connected to the carrying structure, the first guide elements being allowed tilting in the plane of orientation, and/or the second guide element of the first linear guide is connected to the first carriage, and the second guide element of the second linear guide is connected to the second carriage, the second guide elements being allowed tilting in the plane of orientation.

2. The XY table as claimed in claim 1, wherein the first guide elements of the first and second linear guides are each guide rails, and the second guide elements of the first and second linear guides are each sliding elements.

3. The XY table as claimed in claim 1, wherein the first guide elements of the first and second linear guides are connected to the carrying structure, and/or the second guide element of the first linear guide is connected to the first carriage, and the second guide element of the second linear guide is connected to the second carriage, in each case via a rotary joint.

4. The XY table as claimed in claim 1, comprising a tilting device, which is arranged between the first guide elements of the first and second linear guides and the carrying structure and/or between the second guide element of the first linear guide and the first carriage and the second guide element of the second linear guide and the second carriage and is designed to be tiltable perpendicularly to the track plane of the carriage guide rail.

5. The XY table as claimed in claim 4, wherein the tilting device has at least one hinge joint having a triggering element, wherein the linear transport system comprises a further carriage having a tilting element, which is designed to actuate the hinge joint upon engagement with the triggering element in order to bring about a tilting movement of the carrying structure.

6. The XY table as claimed in claim 1, comprising a third linear guide, which is arranged between the second guide elements of the first linear guide and the first carriage and between the second guide element of the second linear guide and the second carriage and is designed in such a way that the first and the second carriage can be moved relative to one another along a linear track.

7. The XY table as claimed in claim 6, wherein the third linear guide has a guide rail and a sliding element, wherein the guide rail can be connected to the first carriage, and the sliding element can be connected to the second carriage.

8. A linear transport system, having a carriage guide rail, which has an arc segment, a first and a second carriage, which are arranged in such a way that they can be moved independently of one another on the carriage guide rail, and an XY table comprising a carrying structure and a first and a second linear guide, which are embodied with an angular offset relative to one another and each have a first and a second guide element, which can be moved relative to one another along a linear track, wherein the first guide elements of the first and second linear guides are connected to the carrying structure, wherein the second guide element of the first linear guide is connected to the first carriage and the second guide element of the second linear guide is connected to the second carriage in order to carry out a movement of the XY table along the transfer path in the X direction in the case of a joint movement of the two carriages and to carry out a movement of the XY table transversely to the transfer path in the Y direction in the case of a relative movement of the two carriages, wherein the first and the second linear guide are oriented parallel to the track plane of the carriage guide rail, and wherein the first guide elements of the first and second linear guides are connected to the carrying structure, the first guide elements being allowed rotation in the track plane of the carriage guide rail, and/or the second guide element of the first linear guide is connected to the first carriage, and the second guide element of the second linear guide is connected to the second carriage, the second guide elements being allowed rotation in the track plane of the carriage guide rail.

9. The linear transport system as claimed in claim 8, wherein the first guide elements of the first and second linear guides are each guide rails, and the second guide elements of the first and second linear guides are each sliding elements.

10. The linear transport system as claimed in claim 8, wherein the first guide elements of the first and second linear guides are connected to the carrying structure, and/or the second guide element of the first linear guide is connected to the first carriage, and the second guide element of the second linear guide is connected to the second carriage, in each case via a rotary joint.

11. The linear transport system as claimed in claim 8, comprising a tilting device, which is arranged between the first guide elements of the first and second linear guides and the carrying structure and/or between the second guide element of the first linear guide and the first carriage and the second guide element of the second linear guide and the second carriage and is designed to be tiltable perpendicularly to the track plane of the carriage guide rail.

12. The linear transport system as claimed in claim 11, wherein the tilting device has at least one hinge joint having a triggering element, wherein the linear transport system comprises a further carriage having a tilting element, which is designed to actuate the hinge joint upon engagement with the triggering element in order to bring about a tilting movement of the carrying structure.

13. The linear transport system as claimed in claim 8, comprising a third linear guide, which is arranged between the second guide elements of the first linear guide and the first carriage and between the second guide element of the second linear guide and the second carriage and is designed in such a way that the first and the second carriage can be moved relative to one another along a linear track.

14. The linear transport system as claimed in claim 13, wherein the third linear guide has a guide rail and a sliding element, wherein the guide rail can be connected to the first carriage, and the sliding element can be connected to the second carriage.

15. The linear transport system as claimed in claim 8, wherein the carriage guide rail forms a closed track.

16. The linear transport system as claimed in claim 8, wherein the carriage guide rail is arranged on a stator, which has a series arrangement of individually energizable coils, wherein the carriages each comprise at least one permanent magnet, which is designed to interact with the magnetic field formed by the series arrangement of individually energizable coils.

17. A linear transport system, having a carriage guide rail, which has an arc segment, a first and a second carriage, which are arranged in such a way that they can be moved independently of one another on the carriage guide rail, and an XY table comprising a carrying structure and a first and a second linear guide, which are embodied with an angular offset relative to one another and each have a first and a second guide element, which can be moved relative to one another along a linear track, wherein the first guide elements of the first and second linear guides are connected to the carrying structure, wherein the second guide element of the first linear guide is connected to the first carriage and the second guide element of the second linear guide is connected to the second carriage in order to carry out a movement of the XY table along the transfer path in the X direction in the case of a joint movement of the two carriages and to carry out a movement of the XY table transversely to the transfer path in the Y direction in the case of a relative movement of the two carriages, wherein the first and the second linear guide are oriented in a plane of orientation perpendicular to the track plane of the carriage guide rail, and wherein the first guide elements of the first and second linear guides are connected to the carrying structure, the first guide elements being allowed tilting in the plane of orientation, and/or the second guide element of the first linear guide is connected to the first carriage, and the second guide element of the second linear guide is connected to the second carriage, the second guide elements being allowed tilting in the plane of orientation.

18. The linear transport system as claimed in claim 17, wherein the first guide elements of the first and second linear guides are each guide rails, and the second guide elements of the first and second linear guides are each sliding elements.

19. The linear transport system as claimed in claim 17, wherein the first guide elements of the first and second linear guides are connected to the carrying structure, and/or the second guide element of the first linear guide is connected to the first carriage, and the second guide element of the second linear guide is connected to the second carriage, in each case via a rotary joint.

20. The linear transport system as claimed in claim 17, comprising a tilting device, which is arranged between the first guide elements of the first and second linear guides and the carrying structure and/or between the second guide element of the first linear guide and the first carriage and the second guide element of the second linear guide and the second carriage and is designed to be tiltable perpendicularly to the track plane of the carriage guide rail.

21. The linear transport system as claimed in claim 20, wherein the tilting device has at least one hinge joint having a triggering element, wherein the linear transport system comprises a further carriage having a tilting element, which is designed to actuate the hinge joint upon engagement with the triggering element in order to bring about a tilting movement of the carrying structure.

22. The linear transport system as claimed in claim 17, comprising a third linear guide, which is arranged between the second guide elements of the first linear guide and the first carriage and between the second guide element of the second linear guide and the second carriage and is designed in such a way that the first and the second carriage can be moved relative to one another along a linear track.

23. The linear transport system as claimed in claim 22, wherein the third linear guide has a guide rail and a sliding element, wherein the guide rail can be connected to the first carriage, and the sliding element can be connected to the second carriage.

24. The linear transport system as claimed in claim 17, wherein the carriage guide rail forms a closed track.

25. The linear transport system as claimed in claim 17, wherein the carriage guide rail is arranged on a stator, which has a series arrangement of individually energizable coils, wherein the carriages each comprise at least one permanent magnet, which is designed to interact with the magnetic field formed by the series arrangement of individually energizable coils.

* * * * *